US011777762B2

(12) United States Patent
Mishra et al.

(10) Patent No.: US 11,777,762 B2
(45) Date of Patent: *Oct. 3, 2023

(54) DISTRIBUTED CLOUD HNG FABRIC

(71) Applicant: Parallel Wireless, Inc., Nashua, NH (US)

(72) Inventors: Rajesh Kumar Mishra, Westford, MA (US); Kaitki Agarwal, Westford, MA (US); Yang Cao, Westford, MA (US); Steven Paul Papa, Windham, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/672,612

(22) Filed: Feb. 15, 2022

(65) Prior Publication Data

US 2022/0173937 A1 Jun. 2, 2022

Related U.S. Application Data

(63) Continuation of application No. 16/724,958, filed on Dec. 23, 2019, now Pat. No. 11,251,994.

(60) Provisional application No. 62/784,404, filed on Dec. 22, 2018.

(51) Int. Cl.
*H04L 12/66* (2006.01)
*H04L 67/10* (2022.01)
*G06F 9/455* (2018.01)
*H04W 84/04* (2009.01)

(52) U.S. Cl.
CPC .......... *H04L 12/66* (2013.01); *G06F 9/45558* (2013.01); *H04L 67/10* (2013.01); *G06F 2009/4557* (2013.01); *G06F 2009/45595* (2013.01); *H04W 84/042* (2013.01)

(58) Field of Classification Search
CPC ....... H04L 12/66; H04L 67/10; H04L 47/125; H04L 47/783; H04L 67/1097; H04L 67/563; G06F 9/45558; G06F 2009/4557; G06F 2009/45595; H04W 84/042; H04W 88/16
See application file for complete search history.

(56) References Cited

U.S. PATENT DOCUMENTS

| | | | |
|---|---|---|---|
| 2017/0272330 A1* | 9/2017 | Cao | H04W 36/08 |
| 2018/0124592 A1* | 5/2018 | Ye | H04W 8/08 |
| 2018/0205722 A1* | 7/2018 | Getschmann | H04L 63/0876 |

* cited by examiner

*Primary Examiner* — Vinncelas Louis
(74) *Attorney, Agent, or Firm* — Michael Y. Saji; David W. Rouille

(57) ABSTRACT

Systems, methods and computer software are disclosed providing a distributed cloud virtualizing gateway fabric. In one example embodiment, a method includes providing at least one virtualizing gateway device in a cloud; wherein at least one of a virtual machine (VM) and a container are created as needed to provide services for the at least one RAN and the at least one core network for each HNG device.

20 Claims, 7 Drawing Sheets

DISTRIBUTED CLOUD HNG FABRIC

CROSS-REFERENCE TO RELATED APPLICATIONS

This application is a continuation of U.S. application Ser. No. 16/724,958, filed Dec. 23, 2019, which claims priority under 35 U.S.C. § 119(e) to U.S. Provisional Pat. App. No. 62/784,404, filed Dec. 22, 2018, titled "Distributed Cloud HNG Fabric", each of which is hereby incorporated by reference in its entirety for all purposes. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. patent application Ser. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1; US20170055186A1; US20170273134A1; US20170272330A1; and Ser. No. 15/713,584. This application hereby incorporates by reference each of the following publications in their entirety for all purposes: U.S. Pat. App. Pub. No. US20140133456A1; U.S. Pat. App. Pub. No. US20150094114A1; U.S. Pat. App. Pub. No. US20150098385A1; U.S. Pat. App. Pub. No. US20150098387A1; U.S. Pat. App. Pub. No. US20160044531A1; U.S. Pat. App. Pub. No. US20170013513A1; U.S. Pat. App. Pub. No. US20170019375A1; U.S. Pat. App. Pub. No. US20170026845A1; U.S. Pat. App. Pub. No. US20170048710A1; U.S. Pat. App. Pub. No. US20170055186A1; U.S. Pat. App. Pub. No. US20170064621A1; U.S. Pat. App. Pub. No. US20170070436A1; U.S. Pat. App. Pub. No. US20170077979A1; U.S. Pat. App. Pub. No. US20170111482A1; U.S. Pat. App. Pub. No. US20170127409A1; U.S. Pat. App. Pub. No. US20170171828A1; U.S. Pat. App. Pub. No. US20170181119A1; U.S. Pat. App. Pub. No. US20170202006A1; U.S. Pat. App. Pub. No. US20170208560A1; U.S. Pat. App. Pub. No. US20170238278A1; U.S. Pat. App. Pub. No. US20170257133A1; U.S. Pat. App. Pub. No. US20170272330A1; U.S. Pat. App. Pub. No. US20170273134A1; U.S. Pat. App. Pub. No. US20170288813A1; U.S. Pat. App. Pub. No. US20170295510A1; U.S. Pat. App. Pub. No. US20170303163A1; U.S. Pat. App. Pub. No. US20170347307A1; U.S. Pat. App. Pub. No. US20180123950A1; U.S. Pat. App. Pub. No. US20180152865A1; U.S. Pat. App. Pub. No. US20180213441A1; U.S. Pat. Nos. 8,867,418; 8,879,416; 9,107,092; 9,113,352; 9,232,547; and 9,455,959.

BACKGROUND

In a 3G/UMTS network architecture, the radio network controller (RNC) provided necessary coordination capability for the radio access network (RAN). In the 4G/LTE network architecture, greater autonomy was given to the RAN node, the eNodeB, but it was determined by Parallel Wireless that it was beneficial to introduce a network node, the Parallel Wireless HetNet Gateway, for performing necessary coordination for eNodeBs. The 5G network infrastructure is currently under consideration. The Third Generation Partnership Project (3GPP) has finalized a draft version of a specification for the new radio technologies being designed for 5G, providing high bandwidth at high frequency, as well as low bandwidth for narrowband Internet of Things (IoT), etc., called 5G-NR or New Radio. However, the 5G core network as being currently considered is very similar to the 4G core network and has limited enhancements to coordination capability beyond what is already part of 4G/LTE.

SUMMARY

The inventors have appreciated that a new network architecture could be used to provide beneficial coordination for 2G/3G/4G as well as 5G networks and heterogeneous networks, the details of which are found in the present disclosure.

A distributed cloud coordination server architecture is provided in which a fabric of coordination servers (which may be Parallel Wireless HNGs) is distributed throughout an area.

In one embodiment, a method includes providing at least one virtualizing gateway in a cloud, each virtualizing gateway using a single Internet Protocol (IP) address for ingress and egress; wherein at least one of a virtual machine (VM) and a container are created as needed to provide services for the at least one RAN and the at least one core network for each virtualizing gateway device; wherein the virtualizing gateway is presented as a single network element for other network elements connecting with the virtualizing gateway; and distributing workloads for a set of virtualizing gateway devices wherein when a given node or VM for an virtualizing gateway cluster is overloaded, new nodes or VM may be spun up to handle the workloads at the overloaded node or VM, and the workloads may be distributed to the new nodes.

In another embodiment, a distributed cloud virtualizing gateway fabric includes at least one virtualizing gateway device in a cloud, each virtualizing gateway using a single Internet Protocol (IP) address for ingress and egress; wherein at least one of a virtual machine (VM) and a container are created as needed to provide services for the at least one RAN and the at least one core network for each virtualizing gateway device; wherein the virtualizing gateway is presented as a single network element for other network elements connecting with the virtualizing gateway; and wherein workloads are distributed for a set of virtualizing gateway devices wherein when a given node or VM for an virtualizing gateway cluster is overloaded, new nodes or VM may be spun up to handle the workloads at the overloaded node or VM, and the workloads may be distributed to the new nodes.

In another embodiment, a non-transitory computer-readable medium containing instructions for core providing a distributed cloud virtualizing gateway which, when executed, cause at least one virtualizing gateway to perform steps comprising: creating at least one of a virtual machine (VM) and a container as needed to provide services for the at least one RAN and the at least one core network for each virtualizing gateway device; wherein the virtualizing gateway is presented as a single network element for other network elements connecting with the virtualizing gateway; and wherein workloads are distributed for a set of virtualizing gateway devices wherein when a given node or VM for an virtualizing gateway cluster is overloaded, new nodes or VM may be spun up to handle the workloads at the overloaded node or VM, and the workloads may be distributed to the new nodes.

DETAILED DESCRIPTION

Figure 1:
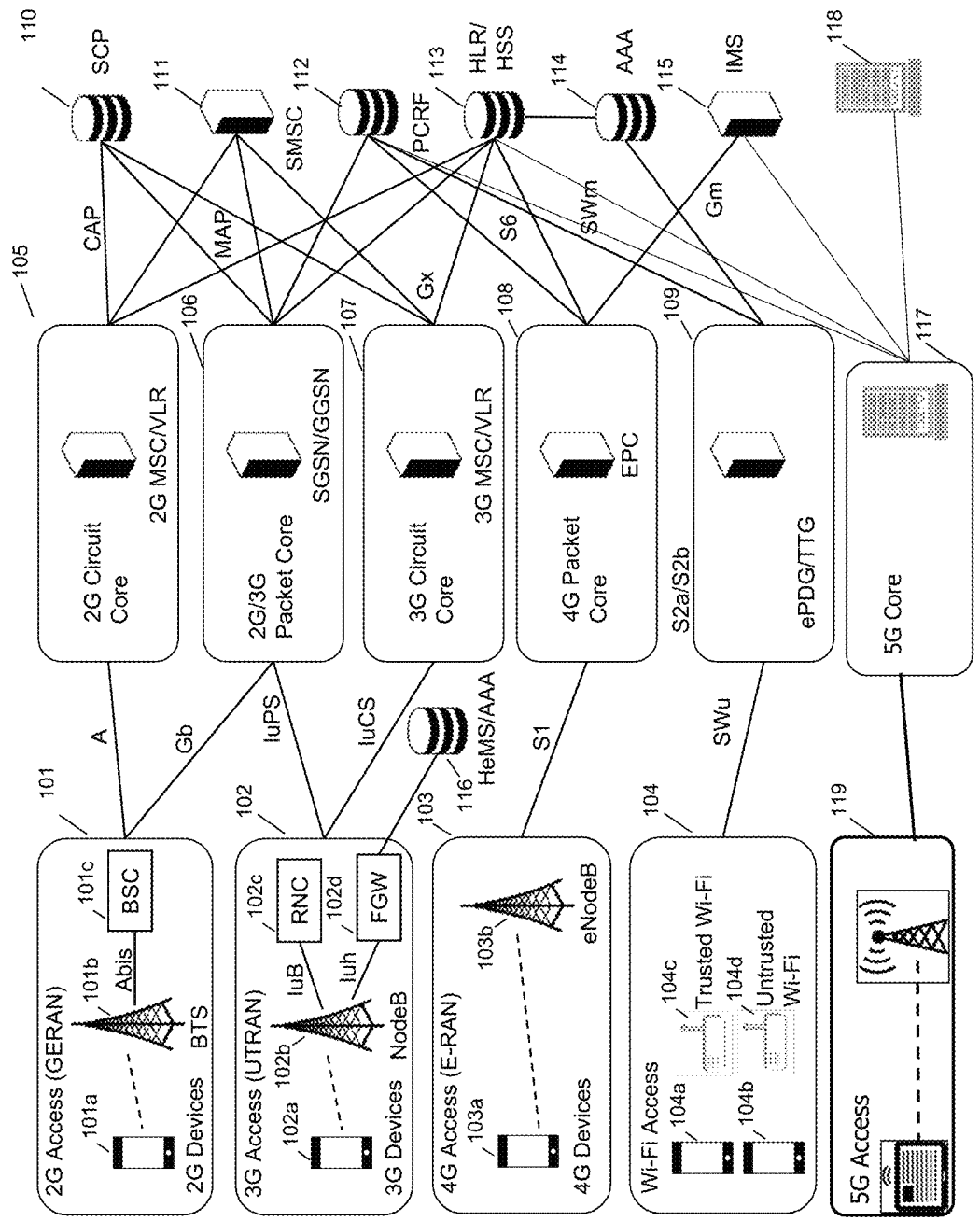
FIG. 1 is a network diagram showing components of prior art networks.

FIG. 1 is a schematic network architecture diagram for 3G and other-G prior art networks. The diagram shows a plurality of "Gs," including 2G, 3G, 4G, 5G and Wi-Fi. 2G is represented by GERAN 101, which includes a 2G device 101a, BTS 101b, and BSC 101c. 3G is represented by UTRAN 102, which includes a 3G UE 102a, nodeB 102b, RNC 102c, and femto gateway (FGW, which in 3GPP namespace is also known as a Home nodeB Gateway or HNBGW) 102d. 4G is represented by EUTRAN or E-RAN 103, which includes an LTE UE 103a and LTE eNodeB 103b. Wi-Fi is represented by Wi-Fi access network 104, which includes a trusted Wi-Fi access point 104c and an untrusted Wi-Fi access point 104d. The Wi-Fi devices 104a and 104b may access either AP 104c or 104d. In the current network architecture, each "G" has a core network. 2G circuit core network 105 includes a 2G MSC/VLR; 2G/3G packet core network 106 includes an SGSN/GGSN (for EDGE or UMTS packet traffic); 3G circuit core 107 includes a 3G MSC/VLR; 4G circuit core 108 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 130, the SMSC 131, PCRF 132, HLR/HSS 133, Authentication, Authorization, and Accounting server (AAA) 134, and IP Multimedia Subsystem (IMS) 135. An HeMS/AAA 136 is present in some cases for use by the 3G UTRAN. The diagram is used to indicate schematically the basic functions of each network as known to one of skill in the art, and is not intended to be exhaustive. For example, 5G core 117 is shown using a single interface to 5G access 119, although in some cases 5G access can be supported using dual connectivity or via a non-standalone deployment architecture.

Noteworthy is that the RANs 101, 102, 103, 104 and 119 rely on specialized core networks 105, 106, 107, 108, 109 and 117. More specifically, for the 2G GERAN, a BSC 101c is required for Abis compatibility with BTS 101b, while for the 3G UTRAN, an RNC 102c is required for Iub compatibility and an FGW 102d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 2:
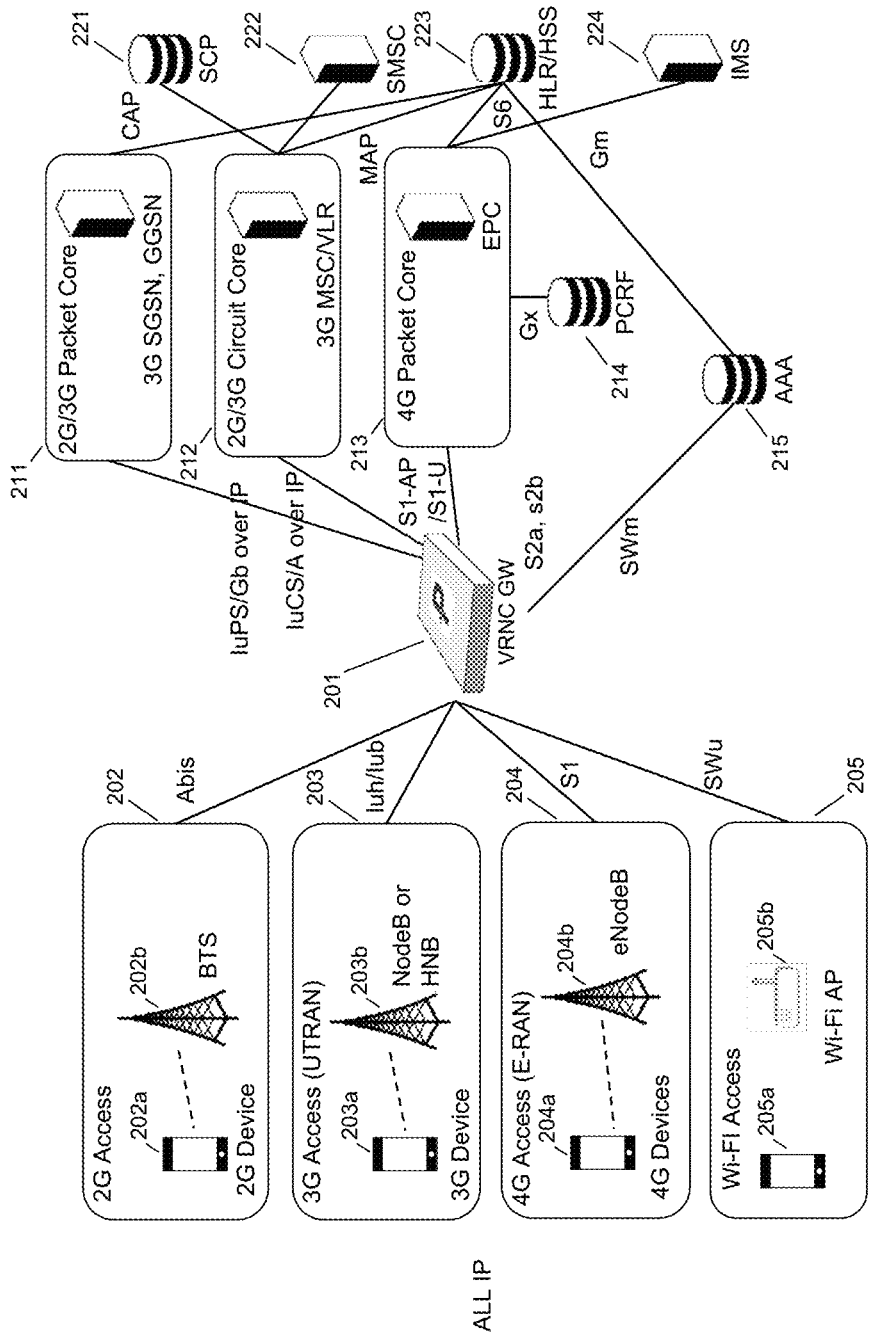
FIG. 2 is a network diagram, in accordance with some embodiments.

FIG. 2 is a schematic network architecture in accordance with some embodiments. The architecture includes a virtual RNC gateway (VRNCGW) 201, which can be a Parallel Wireless HetNet Gateway, or other virtualizing, coordinating, and base station managing node. 2G RAN (GERAN) 202, with mobile station (MS) 202a and BTS 202b, is represented, but an Abis interface is made directly between GERAN 202 and gateway 201. 3G RAN (UTRAN) 203, with UE 203a and base station 203b, connects directly to gateway 201 via Iuh or Iub without an RNC, as the gateway handles the RNC functions. If a nodeB is used, the Iub protocol may be used; if a home NodeB or femto is used, the Iuh protocol may be used. 4G RAN (EUTRAN) 204 is represented by UE 204a and eNodeB 204b, which communicates via S1 to the gateway 201; S1 is the protocol/interface used for eNodeBs in communicating with the LTE base station managing node, the MME. A Wi-Fi RAN 205, including Wi-Fi device 205a and AP 205b, using SWu, is also directly connected to VRNCGW 201, which permits it to be part of the mobile operator network. Instead of SWu, S2a and S2b may also be used; S2a may be used by/for a trusted wireless access gateway (TWAG), and provides a single IPsec tunnel, while S2b is used for interacting as an evolved packet data gateway (ePDG), which is an untrusted gateway that permits multiple IPsec sessions to be opened.

Gateway 201 handles all protocol communications with the inner core network. It may send 2G sessions to either the 2G packet core 211 or the 2G circuit core 212, or 4G sessions to the 4G packet core 213, or circuit-switched fallback (CSFB) sessions to 2G circuit core 212. Authentication, location registration, or packet-based VoIP etc. is handled according to the prior art by PCRF 214, AAA 215, SCP 221, SMSC 222, HLR/HSS 223, IMS 224 as usual. By the action of the gateway 201 as a virtualizing proxy, extraneous details of the RAN are hidden from the core network and vice versa. The gateway is also enabled to perform steering or slicing as appropriate, so that certain UEs or base stations can be directed to other "Gs" (RANs) or resources can be split among networks. The 2G GERAN core network has been eliminated, as all 2G sessions can be handled by the 2G core. Although the legacy GERAN requires that the gateway 201 use Abis, the core network may view the legacy 2G MS's as 2G UEs. The VRNC may provide both a virtual RNC and a HNBGW, in some embodiments, thus enabling RAN virtualization and coordination for both 2G and 4G nodes. The VRNC may also provide a virtual BSC in some embodiments for legacy GERAN base stations.

Figure 3:
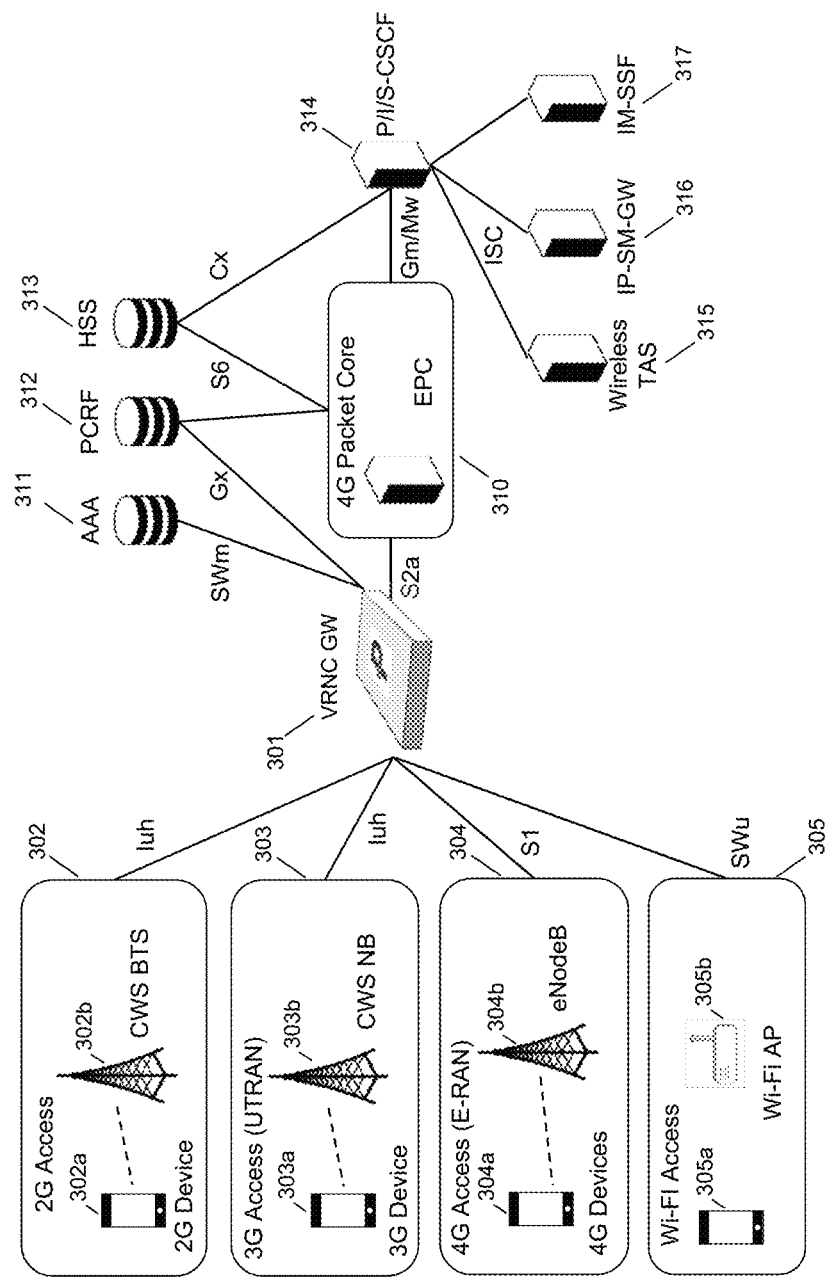
FIG. 3 is another network diagram, in accordance with some embodiments.

FIG. 3 is a schematic network architecture in accordance with some further embodiments. The architecture shown is an exemplary "greenfield" deployment architecture, i.e., an architecture being deployed with new purchases of equipment to provide coverage in areas previously not served by existing equipment. 2G GERAN 302, with MS 302a, BTS 302b; 3G UTRAN 303, with UE 303a and nodeB 303b; 3G EUTRAN 304, with UE 304a and eNodeB 304b; and Wi-Fi access network 305, with mobile device 305a and AP 305b, are still present and each continue to go through VRNCGW 301. However, in this configuration it is not necessary to provide a 3G packet core or circuit core. Instead, a 3G packet core 310 is provided, as well as functions for enabling the 3G core: AAA 311, PCRF 312, HSS 313, and IMS nodes P/I/S-CSCF 314, wireless TAS 315, IP-SM-GW 316, and IM-SSF 317. The IMS core provides voice calling functions and the 3G packet core provides data calling functions.

VRNCGW 301 enables this core network simplification in conjunction with enhanced base stations in the RAN. Instead of legacy 2G and 3G base stations, Parallel Wireless CWS/BTS 302b and Parallel Wireless CWS/nodeB 303b provide additional functionality. CWS/BTS 302b communicates with 2G MS 302a using an A interface, but instead of requiring Abis, CWS 302b may interwork the A interface and provide voice calling using RTP and SIP via IMS, thus requiring only a standard packet-switched session that 3G core network 310 can provide. Parallel Wireless CWS/nodeB 303b may interwork CS sessions similarly to IMS. CWS/BTS 302b and CWS/nodeB 303b both only require Iuh to be handled by VRNCGW 301, such that the VRNCGW is required only to use Iuh and S1/S2/SWu.

Viewed broadly, providing HNG services as an on-demand cloud fabric can be approached in two ways. One way to create a fabric using independent HNGs linked together. Another way is to have a single virtual (logical) HNG with features that enable high flexibility and scalability.

Figure 4:
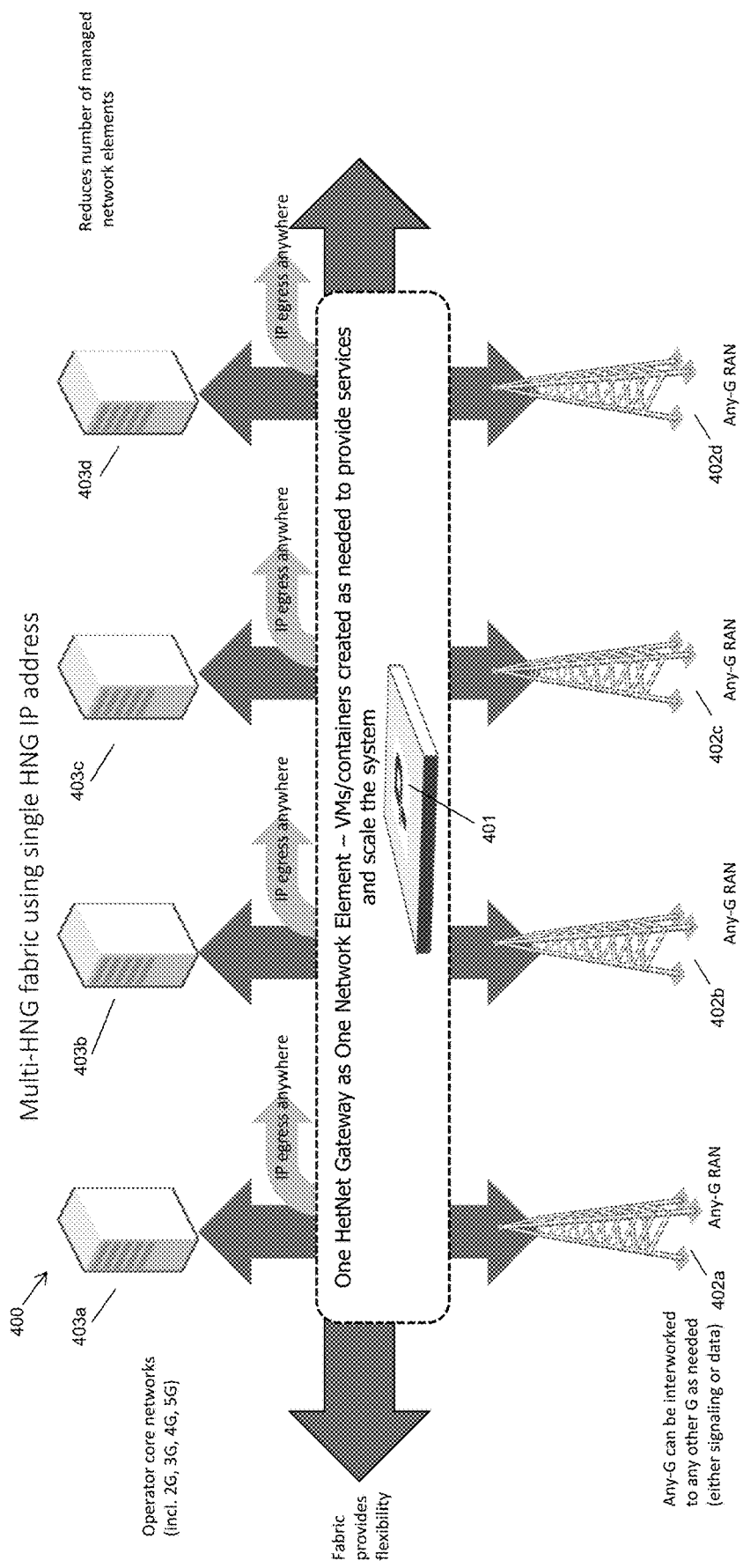
FIG. 4 is a network diagram showing a single HNG implementation, in accordance with some embodiments.

A single HNG implementation 400 is shown in FIG. 4. The HNG is also referred to as a virtualizing gateway herein, and the terms HNG and virtualizing gateway are used interchangeably. The single HNG implementation includes a single HNG 401, in communication with a plurality of RANs 402a-402d and also in communication with a plurality of core networks 403a-403d. A single HNG implementation has been contemplated with the following characteristics: use of a single IP for ingress and egress; scaling using VMs or container; represent as a single network element to other network element connecting with it; redundancy for failover; redundancy based on geography, i.e., if an operator decides to provision a redundant resource for a particular arbitrary geography; and separation of control and data plane for VMs, e.g., some data plane VMs and some control plane VMs.

Such a single HNG could be scaled using VMs or container-based scalability technologies. VMs (virtual machines) is a software technology known in the art for providing a virtual hardware machine in software and for permitting software-based control of a VM, including duplication, spin-up and spin-down of the VM. Containers means Linux, Docker, or other containerization technologies as known in the art that provide the software-based control of a VM at a higher layer than a VM, e.g., providing software-based control of an operating system but not software-based control of the underlying hardware, which benefits by reducing overhead. In some embodiments, VMs may be used to allow software-based control of networking components of a system, containers could be used for software that does not require control of the underlying networking components, and VMs and containers could be mixed and matched.

Each VM/container would do/have some function such as: a load balancing function, used by all traffic, and which could be internal to the HNG and which could be used to share access to the single IP; a database layer, used by all services; control plane function—shared by all control plane functions; and data plane function—shared by all data plane functions, allowing control and data plane functions to be separately scaled up and down. Most services require all four of these functions/virtual functions to be in place, but these functions could be independently scaled.

Each VM or container could be scaled up or down by spinning a new VM or container up or down depending on the need for capacity in the network. An additional load balancing function could be added to enable greater balancing capacity, to enhance capacity, and spun down/deleted when no longer needed. An additional VM or container could be added for control plane, or data plane, to enhance capacity, and spun down/deleted when no longer needed. An additional VM or container could be added for control plane, or data plane, to enhance throughput, and spun down/deleted when no longer needed.

Figure 5:
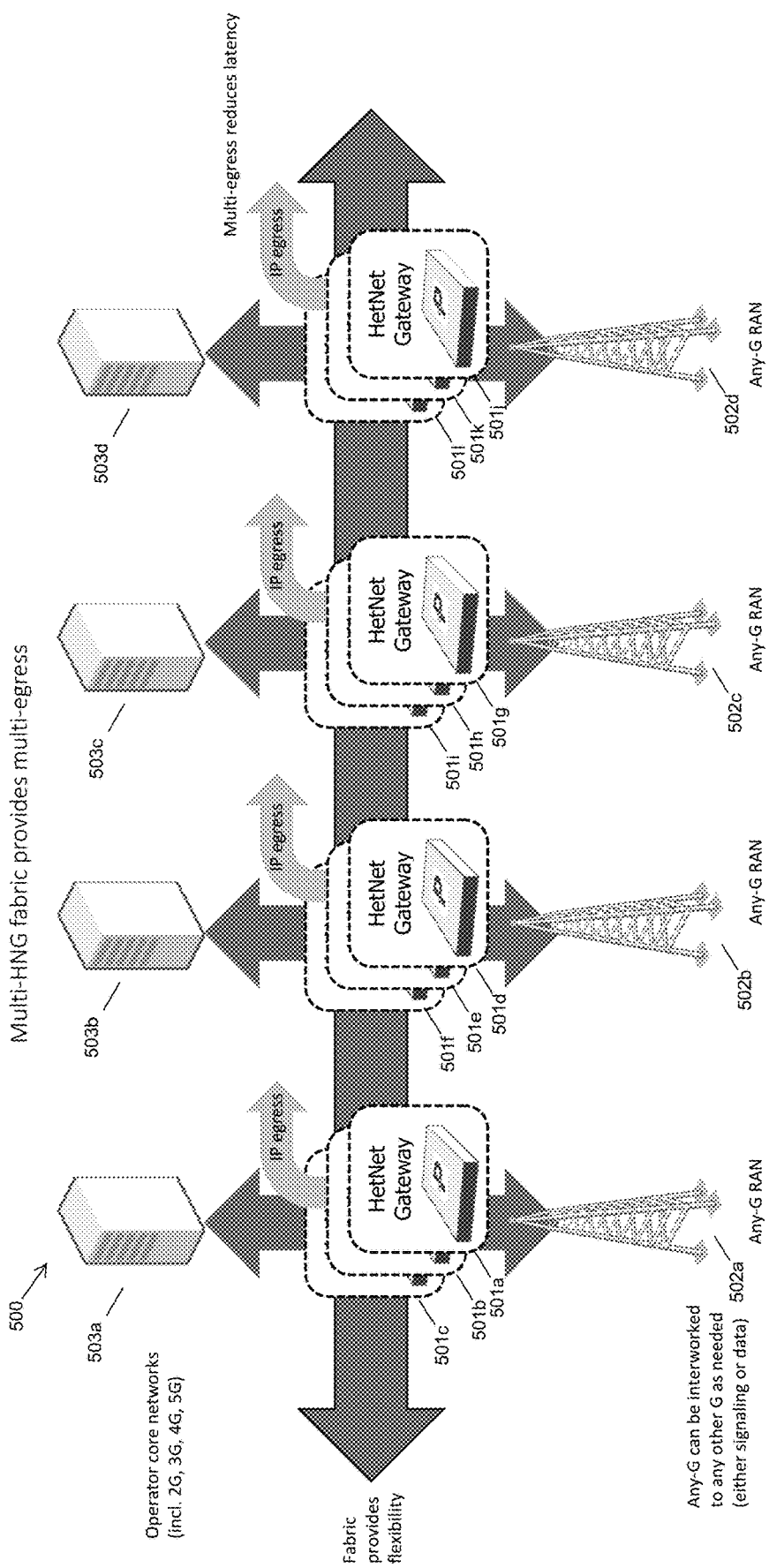
FIG. 5 is a network diagram showing a multiple HNG implementation, in accordance with some embodiments.

Referring now to FIG. 5, an embodiment 500 includes the use of multiple HNGs or HNG functionality distributed across multiple VM clusters in a fabric. HNGs 501a-501c are in communication with RAN 502a and with Core 503a. HNGs 501d-501f are in communication with RAN 502b and with Core 503b. HNGs 501g-501i are in communication with RAN 502c and with Core 503c. HNGs 501j-501l are in communication with RAN 502d and with Core 503d. Embodiment 500 may enable the operator to flexibly provide services that are scalable, containerizable, shareable, divisible or combinable, mappable, etc. The operator may be enabled to flexibly move data among the HNGs or HNG clusters, including data for tracking user state, RAN state, core network node state, IP state, HNG's own state, etc.

A fabric as used herein is at least a plurality of devices that are in rich communication with each other. For example, a plurality of HNGs or HNG clusters arranged in a fabric may all be in communication with each other at a high bandwidth. This enables the HNGs or VMs constituting the HNG to share any particular processing task with each other. The fabric operates in conjunction with an organization of workloads into individually distributable and composable segments to enable individual workloads and tasks to be shared among the nodes connected in the fabric.

The workloads may be shared among nodes at least as follows. If a given node or VM for HNG cluster is overloaded, new nodes or VM may be spun up to handle the workloads at the overloaded node or VM, and the workloads may be distributed to the new nodes. If a given node or VM is underloaded, it may be spun down. Nodes may be spun up, for example, when and where the network is dense, so that more nodes are available to handle management where more demand exists.

Connections among nodes or VMs in the fabric may be using IP. This is typical for containers or virtual machines as well, in which fabric nodes are represented as IP-based endpoints, with IP addresses and port numbers. The inventors have recognized that in some cases SCTP may be preferable to TCP/IP. Routing may be static and may be managed by the node orchestrator. VMs can be used preferentially to provide greater access to the IP stacks of the hardware over containers. Internally, in some embodiments, the network services software modules/VMs are implemented using virtual IP interfaces, BGP routes for autodiscovery of software modules.

Nodes may terminate traffic. For example, the HNG is designed to sit between the RAN and the core network and to terminate traffic before it transits to/from the core network. This enables the nodes to terminate any-G traffic, for example, 2G/3G/4G/5G voice traffic, and interwork it to, for example, 3G voice traffic, and route it to a 3G core network instead of to another core network or the original core network. This also enables the node to route generic data traffic to the Internet locally, which shortens the path to the Internet and thereby reduces latency and core network load (sometimes called local breakout, local IP access or LIPA, etc.). This also enables the nodes to send certain traffic to any particular centralized core depending upon the traffic profile or template. The ultra-low latency that is achieved by avoiding unnecessary transits through the core network is a key value proposition of this architecture.

Certain core network functions may be absorbed into the fabric. For example, mobility management, policy management and enforcement, data network routing, quality of service and prioritization handling, voice interworking, signaling interworking may be performed within the fabric by one or more nodes or distributed VM cluster. Refer to the documents incorporated by reference to understand how the HNG is able to perform core network functions by virtualizing the operation of the RAN nodes towards the core network. By breaking apart the RAN virtualization concept into individual workloads and by sharing the workloads across the HNG fabric, it becomes possible to enable a distributed core network that takes the place of the operator core network for the majority of tasks and workloads, providing individual virtual core networks for localized egress, mobility management, etc. for any given subset of RAN nodes, such that the operator core network is only used for necessary tasks. Since the fabric is enabled to provide sufficient hardware and network resources to handle all requests at in-memory processing speeds, the fabric enables an ultra-low latency core network without any change required to the underlying operator core network.

The HNG may be implemented as containers or virtual machines, and the fabric may be designed to enable containerized or virtualized HNGs to be used. Examples of functionality that is well-known to the inventors for implementations that are containerized or virtualized include: high-speed and low-latency spin-up and spin-down; serializability; scriptability and automatability; in-memory operation; hardware independence/abstraction; resiliency and redundancy; software-based containers with lightweight operating systems and low latency; load balancing; failover; orchestrability using software such as, e.g., Kubernetes. Lightweight text-based endpoints using HTTP, SOAP, XML, etc. could be used in some embodiments to enable the fabric to communicate with other nodes in the fabric; alternatively, binary-based protocols or 3GPP standard protocols could be used. In some embodiments the nodes in the fabric may utilize shared memory, a shared bus, shared storage, etc. In other embodiments the nodes may utilize common namespaces and/or direct data addressing of data stored at a particular node for sharing of data without copying data throughout the fabric. In other embodiments on-prem or off-prem cloud storage may be used. Various technologies as known in the art could be used for manual/automated cluster management, cluster scheduling, and configuration of the internal virtual machines/virtual functions, e.g., Hashicorp Nomad, Consul, Chef, Puppet, Kubernetes, CONSOLAS, etc.

Figure 6:
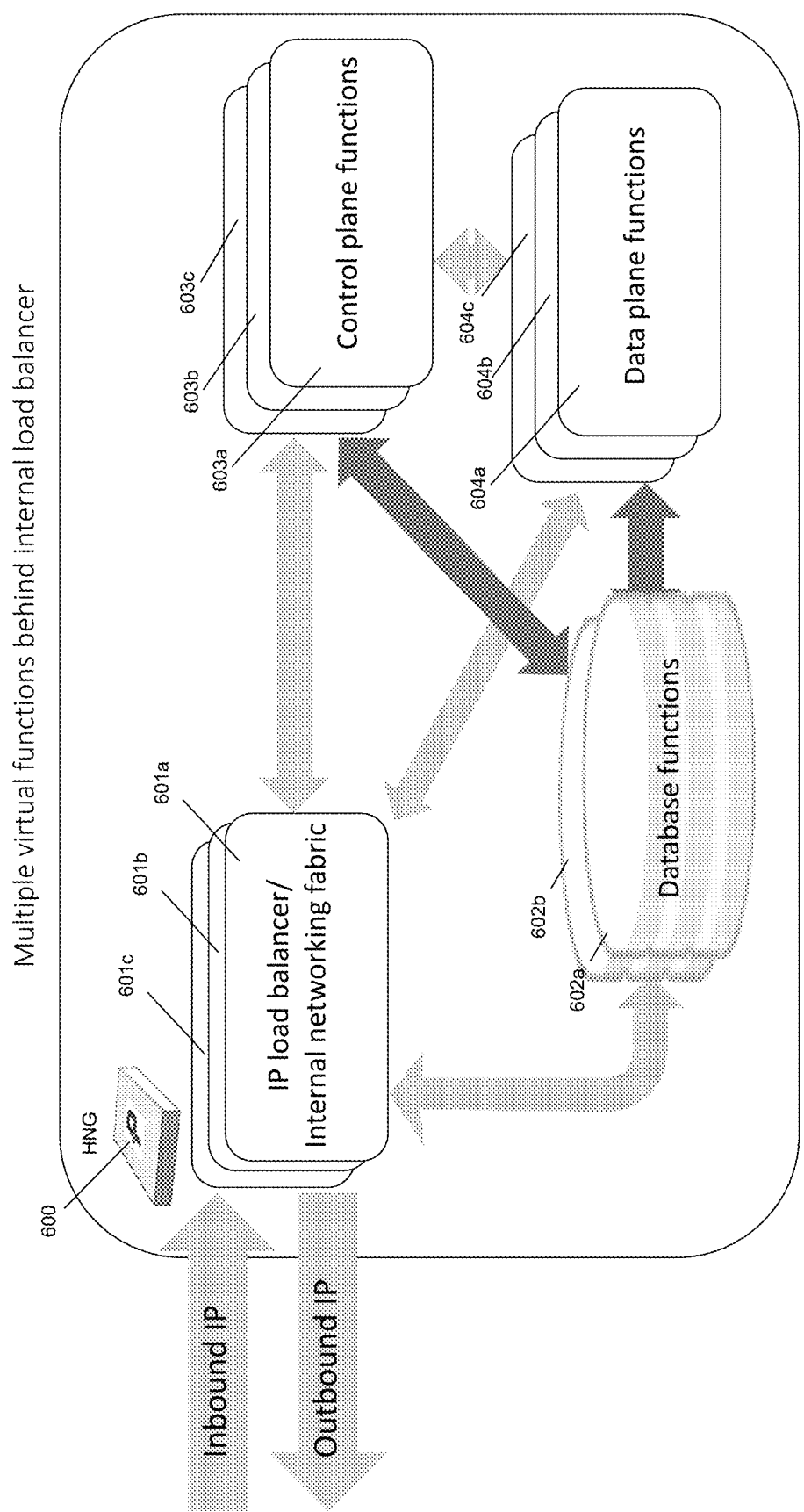
FIG. 6 is a block diagram showing various functions of the HNG, in accordance with some embodiments.

Referring now to FIG. 6, the HNG 600 includes IP load balancer/internal networking fabric elements 601*a-c*, database functions 602*a-b*, control plane functions 603*a-c*, and data plane functions 604*a-c*. The use of a single IP for ingress and egress provides the following advantages: simplified configuration required by telecom operators; no need to reconfigure a large number of network switches for multiple IPs; no need to separately configure machines throughout the network depending on IP networking considerations; no need to reconfigure base stations and core network nodes based on changes made to the HNG for increasing needs or changes required for scalability. As well, some operators are IP-constrained, e.g., not having unlimited IPs to allocate, not moving quickly to IPv6 internal to the network core causing only a small number of IPs to be available, etc. Another advantage is the ability to provide a single aggregated view of the whole network at a single node, since all traffic and management activity is passing through a single node. This eliminates the need to aggregate data from a wide variety of internal management applications. Thus, a key advantage is the ability to have a single IP across many VMs/containers in a network controller node. Having the load balancer moved from external to internal to this single IP allows this.

Security among nodes in the fabric may be maintained using a combination of well-known best practices for security for containerized systems, and authentication, physical security, and network-based security (only certain endpoints may be trusted, only certain networks may be trusted, etc.). Security may be maintained by leveraging the flexibility of the fabric to take nodes offline (e.g., by moving their workloads off to other nodes in the fabric) to enable individual nodes to be upgraded to patch and secure them without disrupting active network traffic loads.

Workloads may be distributed based on various conditions determined by the operator. For example, an operator may distribute 3G loads to one set of nodes/VM clusters and 4G loads to another set of nodes/clusters. For example, an operator may distribute Wi-Fi loads to one set of nodes/clusters, or may distribute loads for lawful intercept to one set of nodes/clusters, or may distribute loads that are high priority or low latency to one set of nodes, or may distribute loads that are data-centric to one set of nodes. Workload differentiation may be changed based on management messages sent throughout the fabric by the operator.

Workloads may also be based on latency demands and geographic demands. Certain workloads, for example SON and power control, are latency-sensitive and should be handled close to the individual RAN nodes that are affected; these workloads could be handled in the fabric at a location close to these RAN nodes. Certain workloads, for example, SON discovery of radios within a region, make sense to be performed as close to the RAN as possible and for the information obtained from these workload steps to be shared throughout the fabric. Another example of these types of workloads are mobile edge compute (MEC) workloads.

Hierarchy may be used to create different topologies for the fabric. Certain nodes may manage services for, and may provide services for, nodes at the bottom of a tree structure (i.e., nodes that do not manage other nodes), and certain nodes may manage nodes that are themselves managing other nodes. This works well when a combination of workloads is present where some workloads are specific to individual nodes (e.g., management of UEs happening at the edge of the network) while other workloads apply to multiple nodes (e.g., SON services that take into account network conditions throughout the network); the workloads that apply to multiple nodes may be handled at a higher level in the hierarchy.

Each HNG can provide management over a specific domain or network, in some ways like a network management gateway, and may provide virtualization by hiding the individual nodes within the specific domain, like a network address translation (NAT) gateway, i.e., it is a virtualization gateway. Each HNG presents itself as an MME to lower nodes and an eNodeB to upstream nodes in the tree (in the core network direction), e.g., sub-HNG presents as an eNB to higher-HNG in the operator network. Each HNG can handle 2G, 3G, 4G, and 5G in addition to 4G (e.g., virtualization and management for BTS, nodeB, and gNodeB, dual connectivity, connectivity to 2G/3G/4G/5G core, Wi-Fi base stations via ePDG, and other functionality as described elsewhere herein and with reference to the documents incorporated by reference. Each HNG can virtualize one radio access technology (RAT) to another node, e.g., a 3G nodeB can be virtualized as a 4G eNodeB to the 4G core and the 4G core can be virtualized as a 3G core to the 3G nodeB, using stateful proxying.

Figure 7:
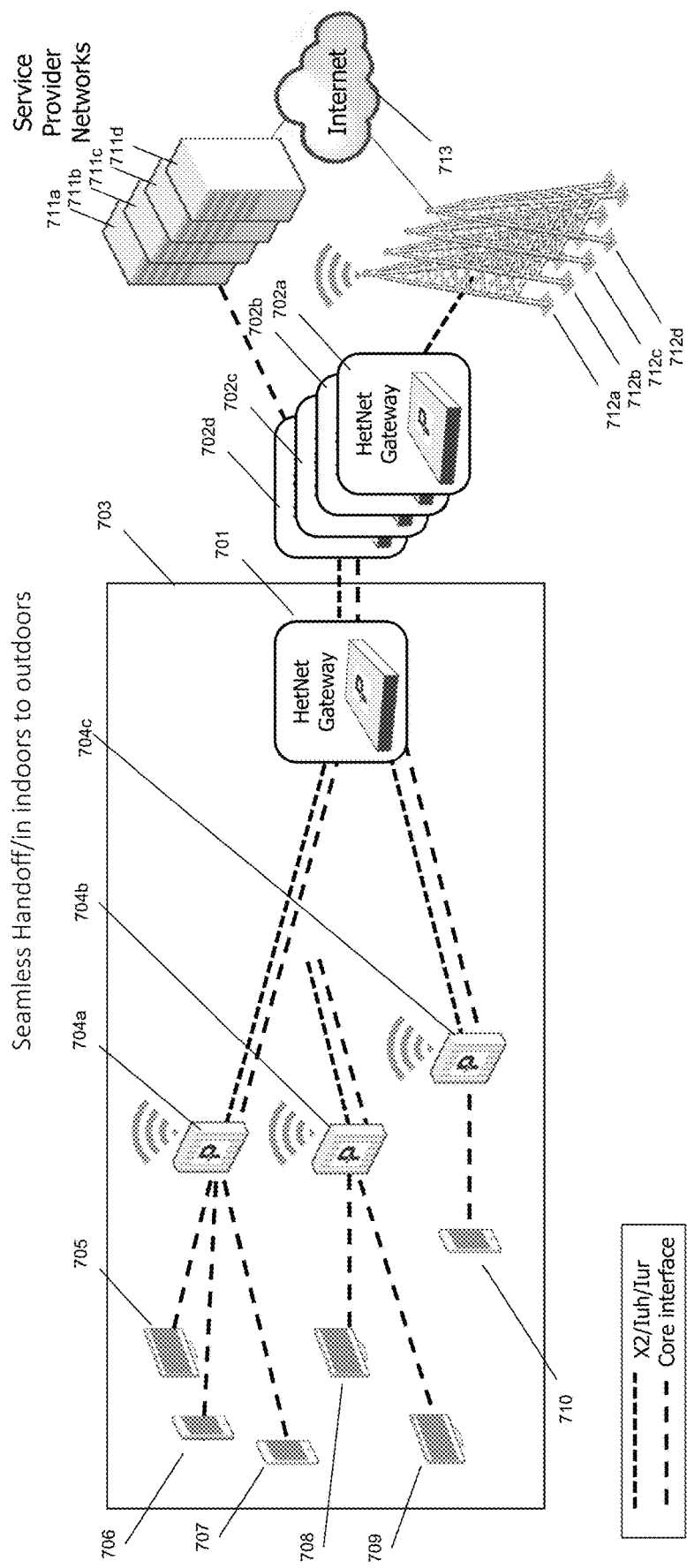
FIG. 7 is a diagram showing an HNG hierarchy, in accordance with some embodiments.

A hierarchical embodiment is shown in FIG. 7, wherein a first level includes HNG 701, nodes 704a-c and devices 705-710 within an enterprise 703. As shown in FIG. 7, typically one HNG and/or HNG cluster 701 can be deployed within a corporation or enterprise 703, and another HNG/HNG cluster 702a-d within an operator network can be deployed hierarchically, in which the enterprise HNG is located under the operator HNG in a hierarchy. The HNG cluster 702a-d is in communication with HNG 701 as well as with RANs 712a-d and service provider networks 711a-d, which are in communication with Internet 713. Advantages of such an embodiment include: security over traffic that does not need to transit the operator network; ability to use IPsec; portability—you can use another network operator by connecting your enterprise HNG to another network operator's HNG. Multiple core networks (MOCN) could be used as egress by the enterprise HNG.

Typically a single level of hierarchy is enough to provide the benefits listed above, both for the enterprise and for the network operator. Multiple levels of hierarchy could be used in some cases. One such scenario in which this could work would be multiple network operators with different ownership of infrastructure.

Example embodiments and use cases In an in-building use case, suppose there are three operators, each have their own HNG or HNG fabric, and that the building owner also has its own HNG or HNG fabric. Then for the in-building solution (IBS), each building's HNG utilizes the HNG's multi-operator core network (MOCN) support capability to enable egress into each of the three operators' HNGs as appropriate. All the in-building cells are locally managed by local HNG (hand off optimization, local SON etc.) whereas operator's HNG does remote SON, remote handover optimization (to macro) etc. A split is performed between the workloads and features that are local and that are remote e.g. local-SON, remote-SON etc., with some features being handled by the in-building SON or an individual operator's SON. This split illustrates the benefit of enabling certain tasks to be handled using a hierarchical deployment architecture.

Another example use case of the present disclosure is providing appropriate infrastructure for densification of the cellular network. A mobile operator may deploy a fabric of management nodes as described herein in a data center that is located close to a metropolitan area. This fabric is able to spin up resources when needs increase. For example, the operator may deploy 1000+ small cells throughout the metropolitan area, and may roll the small cells out over time. The management nodes can scale up as needed to handle management of the small cells and terminating the traffic originated from the small cells. Management of the traffic is also enabled in a scalable way so that, for example, the network operator is able to monitor types of traffic, classes of traffic, RAT being used, etc. and allocate resources in an as-needed way as traffic increases and decreases. The small cells can be upgraded at any time to support different RATs and the management fabric may be able to support the upgrades, without necessarily making any change to the core network or core networks, as the management fabric can provide interworking.

Another example use case is the use of one HNG or one HNG fabric per state in the U.S. This enables a mobile operator to administratively segregate different regions to comply with different state laws, to separately monitor costs associated with servicing users in different states, etc. Since the HNG fabric is able to spin up and spin down nodes as needed, it is possible to handle metropolitan workloads as well as rural workloads. Since each state has its own fabric, users in each state have a short distance to transit through the network before egressing the mobile operator's network, enabling extremely low latency and also conforming to user expectations of low latency to destinations in close geographic proximity.

Another example is a deployment of 5G in a multi-use case manner. 5G is designed for at least the following use cases: ultra-high speed; ultra-low latency; and Internet of Things (IoT); however, these use cases have dramatically different needs within the core network as well as in the RAN. An example deployment according to the present disclosure could involve deployment of multiple RAN nodes in a dense arrangement, which is suitable for 5G high speeds using 5G New Radio (NR) waveforms that operate at a high bandwidth but do not propagate geographically very far; as well as additional RAN nodes providing low-speed coverage for IoT. The densely arranged RAN nodes can be managed by one or more HNG fabrics that enable not only high speed processing of management workloads but ultra-low latency using multiple, distributed egresses throughout the network close to the RAN. The HNG fabrics can also spin up a small number of nodes as needed dedicated to the IoT processing, perhaps periodically if the IoT traffic is periodic, without having to deploy hardware specifically provisioned for handling the IoT traffic.

The bandwidths between fabric nodes may not all necessarily be the same. For example, one advantageous deployment could be one or more HNGs in a specific area, for example, within a corporate office building, with sufficient bandwidth to the core network; and one or more HNGs in the core network, all of which interoperate as a single fabric. The fabric may provide enough bandwidth between the corporate office building HNGs and the core network HNGs to provide fabric capabilities, even though bandwidth among the core network HNGs is higher than the bandwidth into and out of the office building.

The area for the distributed fabric may be a geographic area or a logical area. For example, a company may deploy one or more HNGs in a fabric or create a fabric from one HNG as a distributed VM clusters that is organized by the logical divisions of the corporation, or by floors of an office building, or by security domains within the corporation, etc. Or, a telecom operator may deploy one or more HNGs in a fabric that is organized by the logical divisions of the telecom network. These two examples are exemplary and do not limit the possible deployment configurations.

Any radio access technology (RAT) ("any-G") and any backhaul ("any-haul") is contemplated for the RAN nodes that are coupled to the fabric.

The above disclosure is understood by the inventors to be flexibly appropriate for 2G, 3G, 4G, 5G, or a combination thereof. The inventors have contemplated the use of the HNG network gateway described herein for both 5G stand-alone and 5G non-standalone network architectures, and the HNG may be placed in the network between a gNodeB and the EPC in the (for non-standalone) or between the gNodeB (or 4G RAN) and the 5G core network (for standalone). In the case of 5G dual connectivity, the HNG may be logically placed in either the 4G network or the 5G network, or both.

Egress for any given traffic may be determined arbitrarily to be any egress for any node in the fabric.

In some embodiments, a hybrid option, where some HNGs are VM/cluster based and other HNGs are single-instance node based, could be used if needed.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for providing a distributed cloud virtualizing node fabric, comprising:
    providing at least one virtualizing cloud node in a computing cloud, the at least one virtualizing cloud node providing services for at least one radio access network (RAN) with respect to at least one core network, the at least one virtualizing cloud node in communication with other virtualizing cloud nodes in a virtualizing cloud node cluster in a fabric,
    wherein at least one of a virtual machine (VM) and a container are created as needed to provide the services for the at least one RAN and the at least one core network at each virtualizing cloud node, and
    wherein the virtualizing cloud node cluster is presented as a single network element for other network elements connecting with the at least one virtualizing cloud node; and
    distributing workloads for a set of virtualizing cloud nodes wherein when a given node or VM for the virtualizing cloud node cluster is overloaded, new nodes or VMs may be spun up to handle the workloads at the overloaded node or VM, and the workloads may be distributed to the new nodes,
    thereby providing reduced latency access from the at least one RAN towards the set of virtualizing cloud nodes.

2. The method of claim 1, wherein a RAN uses one of a 2G, 3G, 4G and 5G radio access technology (RAT).

3. The method of claim 1, wherein the at least one VM and container implement at least one of: high-speed and low-latency spin-up and spin-down; serializability; scriptability and automatability; in-memory operation; hardware independence/abstraction; resiliency and redundancy; software-based containers with lightweight operating systems and low latency; load balancing; failover; and orchestrability.

4. The method of claim 1, wherein distributing the workloads for the set of virtualizing cloud nodes includes distributing according to at least one of RAT type, latency demands and geographic demands.

5. The method of claim 4, wherein distributing the workloads for the set of virtualizing cloud nodes is determined by an operator.

6. The method of claim 1, further comprising configuring the set of virtualizing cloud nodes in a hierarchy.

7. The method of claim 1, wherein an area for the distributed cloud virtualizing node fabric is one of a geographic area and a logical area.

8. The method of claim 1, wherein the virtualizing cloud nodes in the virtualizing cloud node cluster are scattered throughout a network to provide localized traffic egress.

9. A distributed cloud virtualizing fabric, comprising:
    at least one virtualizing cloud node in a virtualizing cloud node cluster, the virtualizing cloud node cluster using a single Internet Protocol (IP) address for ingress and egress;
    wherein at least one of a virtual machine (VM) and a container are created as needed to provide services for at least one RAN and at least one core network for each virtualizing cloud node;
    wherein the virtualizing cloud node cluster is presented as a single network element for other network elements connecting with the virtualizing cloud node; and
    wherein workloads are distributed for a set of virtualizing cloud nodes wherein when a given node or VM for the virtualizing cloud node cluster is overloaded, new nodes or VM may be spun up to handle the workloads at the overloaded node or VM, and the workloads may be distributed to the new nodes.

10. The distributed cloud virtualizing fabric of claim 9, wherein a RAN interface is one of a 2G, 3G, 4G and 5G RAT.

11. The distributed cloud virtualizing fabric of claim 9, wherein the at least one VM and container implement at least one of: high-speed and low-latency spin-up and spin-down; serializability; scriptability and automatability; in-memory operation; hardware independence/abstraction; resiliency and redundancy; software-based containers with lightweight operating systems and low latency; load balancing; failover; and orchestrability.

12. The distributed cloud virtualizing fabric of claim 9, wherein workloads are distributed for the set of virtualizing cloud nodes according to at least one of RAT type, latency demands, geographic demands and operator determination.

13. The distributed cloud virtualizing fabric of claim 9, wherein the set of virtualizing cloud nodes are configured in a hierarchy.

14. The distributed cloud virtualizing fabric of claim 9, wherein an area for the distributed cloud virtualizing fabric is one of a geographic area and a logical area.

15. A non-transitory computer-readable medium containing instructions for providing a distributed cloud virtualizing node which, when executed, cause at least one virtualizing cloud node to perform steps comprising:
    creating at least one of a virtual machine (VM) and a container as needed to provide services for at least one RAN and at least one core network for each virtualizing cloud node;
    presenting the virtualizing cloud node as a single network element for other network elements connecting with one or more virtualizing cloud nodes in a virtualizing cloud node cluster; and
    distributing workloads for a set of virtualizing cloud node devices such that when a given node or VM for the virtualizing cloud node cluster is overloaded, new nodes or VM may be spun up to handle the workloads at the overloaded node or VM, and the workloads may be distributed to the new nodes.

16. The non-transitory computer-readable medium of claim 15, wherein a RAN interface is one of a 2G, 3G, 4G and 5G RAT.

17. The non-transitory computer-readable medium of claim 15, further comprising instructions wherein the at least one VM and container implement at least one of: high-speed and low-latency spin-up and spin-down; serializability; scriptability and automatability; in-memory operation; hardware independence/abstraction; resiliency and redundancy; software-based containers with lightweight operating systems and low latency; load balancing; failover; and orchestrability.

18. The non-transitory computer-readable medium of claim 15, further comprising instructions wherein the workloads for the set of virtualizing cloud node devices is distributed according to at least one of RAT type, latency demands and geographic demands or wherein the workloads for the set of virtualizing cloud node devices is determined by an operator.

19. The non-transitory computer-readable medium of claim 15, further comprising instructions wherein the set of virtualizing cloud node devices are configured in a hierarchy.

20. The non-transitory computer-readable medium of claim 15, further comprising instructions wherein an area for a distributed fabric is one of a geographic area and a logical area.

* * * * *